United States Patent [19]

Chein

[11] Patent Number: 4,754,523
[45] Date of Patent: Jul. 5, 1988

[54] FASTENING TOOL FOR WHEEL COVER.

[76] Inventor: Tzy-Hung Chein, 4th Fl., No. 3, Lane 5, Alley 251, Sec. 3, Chung Hsiao E. Road, Taipei, Taiwan

[21] Appl. No.: 28,695

[22] Filed: Mar. 20, 1987

[51] Int. Cl.[4] .............................................. E05D 5/02
[52] U.S. Cl. ...................................... 16/223; 16/338; 411/173
[58] Field of Search .................. 16/223, 338, 237–241, 16/254, 270, 384; 411/170–175

[56] References Cited

U.S. PATENT DOCUMENTS 3,118,480 1/1964 Kreider ................................ 411/173
3,217,354 11/1965 May ........................................ 16/338

Primary Examiner—Nicholas P. Godici
Assistant Examiner—Carmine Cuda
Attorney, Agent, or Firm—Browdy and Neimark

[57] ABSTRACT

A fastening tool for wheel covers comprising a fixing blade, a clipping blade, a rod, a nut and a supporting sheet. These elements are configured so as to clamp the portion immediately after the hand hole of a wheel body. A plurality of fastening tools are, in turn, fixed externally onto a wheel cap. After proper adjustment of these structures, a passage will be provided for a bolt to screw therethrough.

1 Claim, 5 Drawing Sheets

FASTENING TOOL FOR WHEEL COVER

BACKGROUND OF THE INVENTION

This invention relates primarily to fastening tool for wheel cover, and in particular, to a fastening tool for wheel cover used in medium or large sized trucks or buses.

To ornament a vehicle with wheel covers is well-known in the prior art. Besides the function of beautification, a wheel cover which comprises a wheel cap and a hub cap protects the car wheel and the hub from being contaminated by dirt or slurry.

Conventional wheel covers are inconvenient with respect to the job of mounting or removing a wheel cover onto or out of a wheel for new tire mounting or tire inspection or the like.

The major drawback of conventional wheel covers comes from the very large torsional force that must be exerted onto the wheel body for rigid engagement. Therefore, it is difficult for one to do the mounting or dismounting job without the aid of device provided in the workshop.

SUMMARY OF THE INVENTION

It is a primary objective of the present invention to provide a fastening tool for wheel cover.

Another objective of the present invention is to provide a fastening tool for wheel cover which can be used to mount onto a car wheel conveniently.

These and other objectives will be apparent from a careful reading of the description provided below, with appropriate reference to the attached drawings.

DETAILED DESCRIPTION OF A PREFERRED EMBODIMENT

Figure 1:
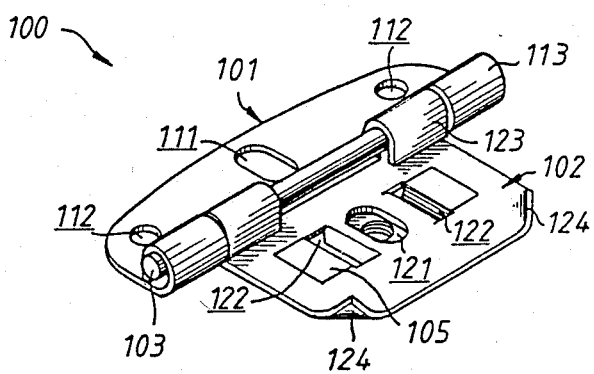
FIG. 1 is a perspective view of a fastening tool in accordance with the present invention.
Figure 2:
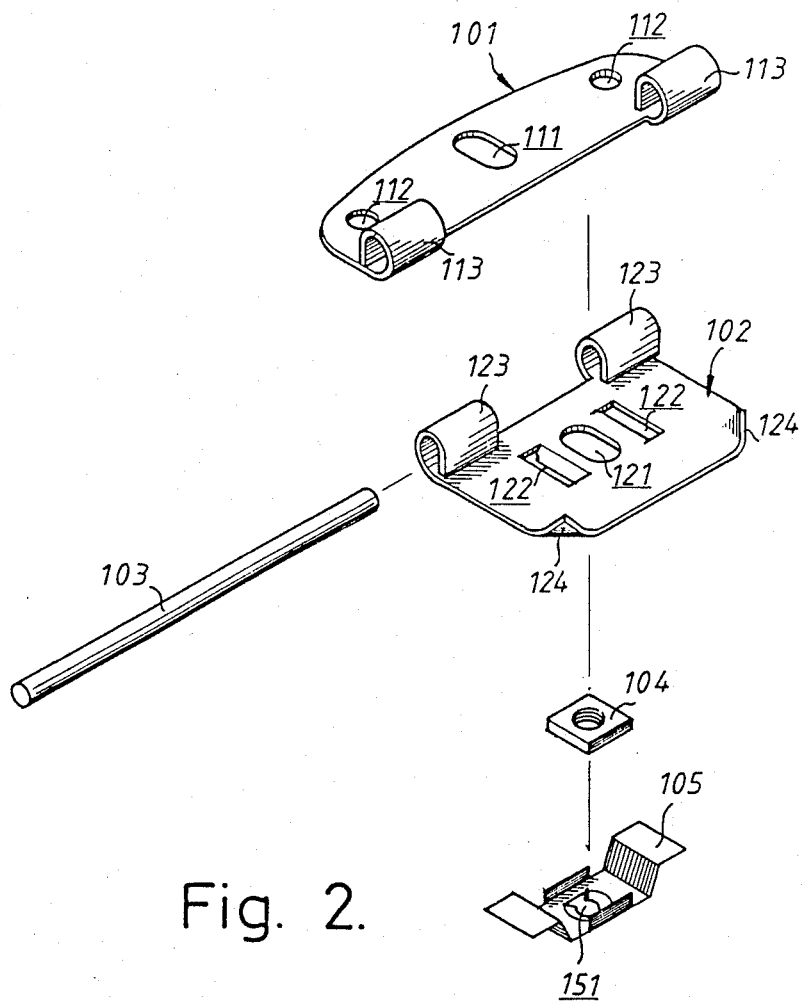
FIG. 2 is an exploded veiw of the fastening tool illustrating its structure.

Referring first to FIG. 1 and 2, it can be seen that a fastening tool in accordance with the present invention is illustrated in perspective generally at 100. Said fastening tool 100 comprises a fixing blade 101, a clipping blade 102, a rod 103, a nut 104 and a supporting sheet 105.

The fixing blade 101 has an elliptically formed hole 111 on the center thereof. A rivet hole 112 is provided at the both sides of the central hole 111. The fixing blade 101 is folded at one side so as to form a pair of rod-receiving means 113.

The clipping blade 102 also has an elliptically formed hole 121 on the center thereof, which is in alignment with the central hole 111 provided on the fixing blade 101. A slit 122 is provided at the both sides of the central hole 121. The clipping blade 102 is substantially in a rectangular shape and one side thereof is folded so as to form a pair of rod-receiving means 123. The tow corners of the other side are bent to become two flip ends, whereby two fastening teeth 124 are formed.

The fixing blade 101 and clipping blade 102 are hinged together by inserting a rod 103 through those rod-receiving means 113 and 123.

A nut 104, which is substantially rectangular in shape, is installed in alignment with the central hole 121 and is attached to the lower surface of said clipping blade 102.

A supporting sheet 105 is provided so as to support the nut 104 onto the clipping blade 102 and to enclose the nut 104 with its walls. A hole 151 is provided on the sheet 105 and which is also in alignment with the central holes 111 and 121, as well as the nut 104. The two ends of the supporting sheet 105 pass through two corresponding slits 122 provided at the clipping blade 102 and extend sidewards on the upper surface thereof to maintain an appropriate stability within the structure.

Figure 3:
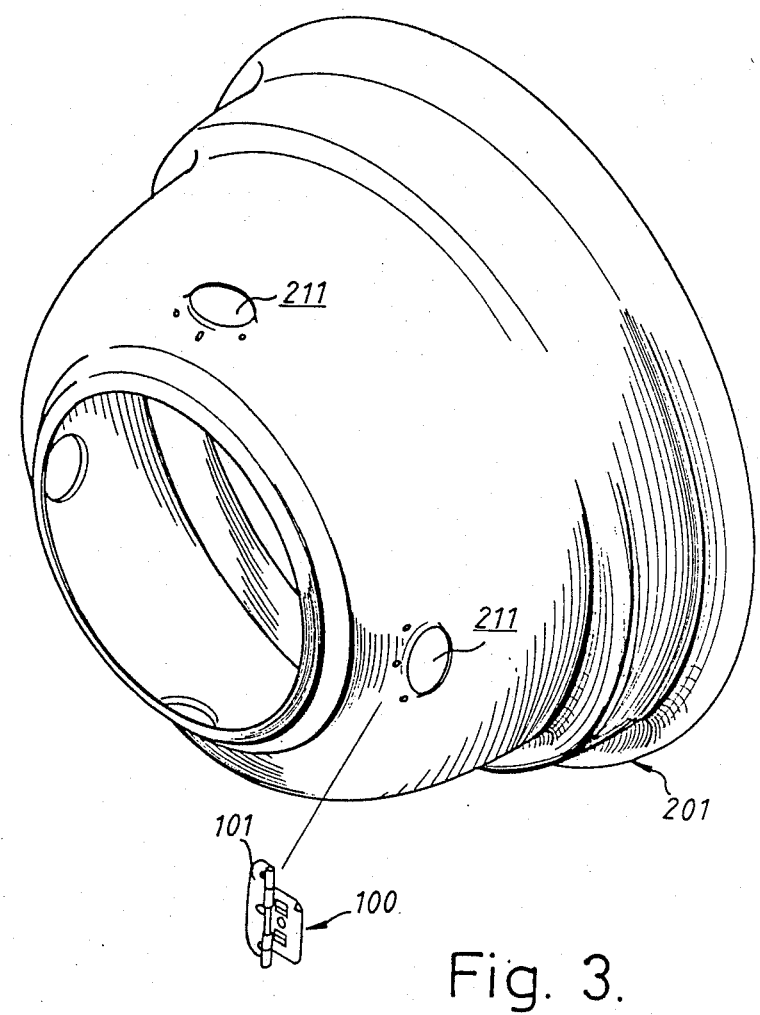
FIG. 3 is a schematic view showing the attachment of the fastening tool onto a wheel cap.

Referring next to FIG. 3, a plurality of fastening tools 100 are seen to engage externally to a wheel cap 201 with its fixing blade 101 fixed to the locality of the hand holes 211 of wheel cap 201, preferably, by a riveted joint. In this case, the rivet holes 112 of fixing blade 101 will be plugged by rivet accordingly.

Figure 4:
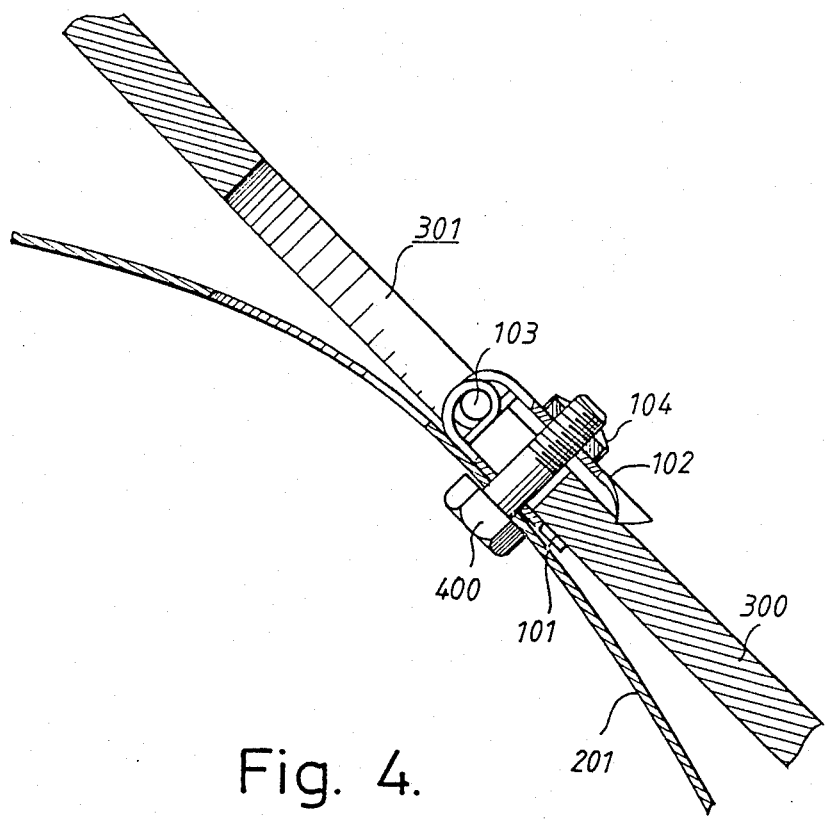
FIG. 4 is a sectional view of the fastening tool illustrating its engagement with a wheel and a wheel cap.
Figure 5:
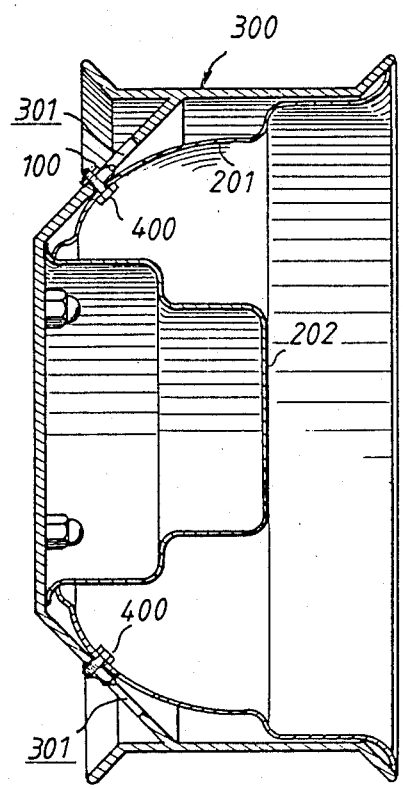
FIG. 5 schematically shows the overall working of the fastening tool in a wheel.

Referring next to FIG. 4 and 5, a fastening tool 100 that is engaged to a wheel cap 201 is shown in combination with a wheel body 300. When a wheel cover comprising the wheel cap 201 and a hub cap 202 is to be mounted onto the wheel body 300, the hat-like hub cap 202 is first mounted onto the hub. A wheel cap 201 having a central opening formed therein for stabilizing the hub cap 202 is forced against the wheel body 300. The fastening tool 100 is disposed in an arrangement such that the hand hole 211 of the wheel cap 201 is in alignment with the hand hole 301 of the wheel body 300. The portion immediately after the hand hole 301 of the wheel body 300 is clamped by the fastening tool 100 which is now held in a U-shaped configuration. When a bolt 400 is fully screwed into the nut 104 of the fastening tool, the fastening teeth 124 are forced against the wheel body 300, thereby urging it into a tightly intact manner. After screwing every fastening tool 100 that is provided on the wheel cap 201 to the wheel body 300, a rigid fixation of a wheel cover onto a wheel body 300 is hence achieved.

The Rotation and Vibration test of the present fastening tool fixed on car wheel and wheel cover is provided hereinafter for reference.

FASTENING TOOL TEST APPARATUS (i) Wheel with wheel cover of $16\frac{1}{2}'$ (Outer Diameter 450 mm) [Outer diameter of tire is supposed to be 24" with a circumference of 1910 mm]

(ii) Four fastening tools to clip the wheel cover on wheel.

(iii) Rotation and Vibration machine with stand and speed controller. (Motor: $7\frac{1}{2}$ HP, 30, 4 Poles, 1730 rpm.)

TESTING METHODS

Method One:

Wheel cover is fixed on wheel with the present fastening tool. The wheel is rotated at high speed of 200 km/hour, then speed is reduced to about 30 km/hour. Simultaneously, wheel is vibrated when in motion and within a range of 4 cm. Acceleration and deceleration is repeated for a period of 8 hours.

Method Two:

Wheel cover is fixed on wheel with the present fastening tool. The wheel is rotated at high speed of 200 km/hour. Simultaneously, wheel is vibrated when on motion and within a range of 4 cm. This continuous motion is tested for a period of 8 hours.

RESULTS

There is no change of position of fastening tool. It is still screwed tight on wheel and wheel cover.

While the invention has been described in relation to its preferred embodiment, it is to be understood that numerous modifications, alterations and alternate embodiments may be contemplated by those skilled in the art upon reading this specification. It is envisioned that all such alternate embodiments are considered to be within the scope of the present invention as defined by the appended claims.

I claim:

1. A fastening tool for wheel cover comprising:
   a fixing blade having an elliptically formed hole on the center thereof and a pair of rod-receiving means at one side thereof;
   a clipping blade having an elliptically formed hole on the center thereof with a slit provided at both sides of said central hole, a pair of rod-receiving means provided at one side thereof and two fastening teeth formed at the two corners of the other side thereof;
   a rod inserted through said two pairs of rod-receiving means provided on said fixing blade and clipping blade;
   a nut attached to the lower surface of said clipping blade; and
   a supporting sheet for supporting the nut onto said clipping blade having a hole on the center thereof, both ends of said supporting sheet passing through the slits provided on said clipping blade and extending sidewards on the upper surface of said blade.

* * * * *